Jan. 15, 1957     J. HIEBERT     2,777,421
ANIMAL RUBBING INSECTICIDE APPLICATOR
Filed Dec. 7, 1954
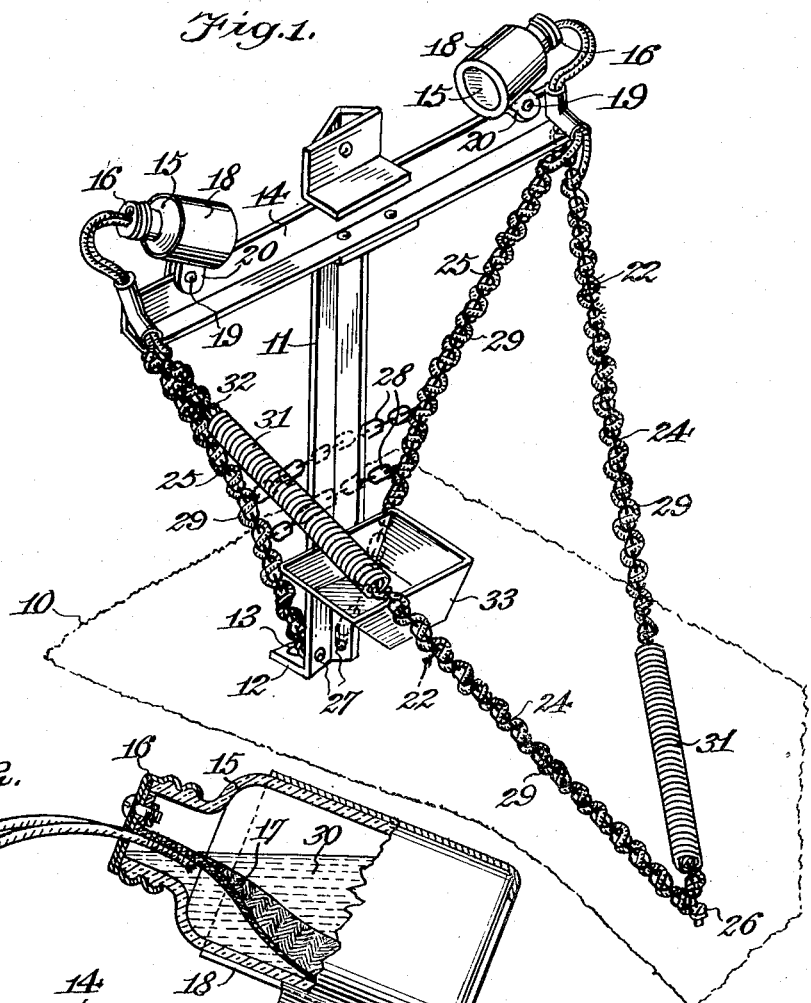
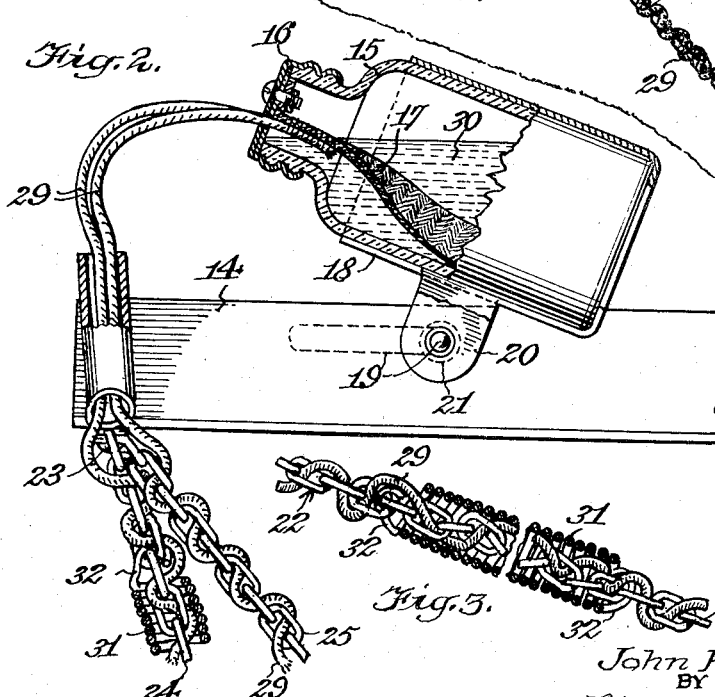
INVENTOR
John Hiebert
BY
Munn, Liddy, Nathanson & March
ATTORNEYS United States Patent Office 2,777,421
Patented Jan. 15, 1957

2,777,421

ANIMAL RUBBING INSECTICIDE APPLICATOR

John Hiebert, Hillsboro, Kans.

Application December 7, 1954, Serial No. 473,626

5 Claims. (Cl. 119—157)

This invention relates to a device for applying an insecticide to livestock for the purpose of eradicating insects such as flies, lice, grub worms and other parasites that molest and injure the livestock such as hogs and cattle.

More particularly, this invention relates to a device for the stated purpose which transfers the insecticide to the animals while rubbing or coming in contact with the insecticide laden parts of the device, and so enabling the animals to rid themselves of the insects or parasites.

The principal object of the present invention is the provision of a device of the indicated character which assures a steady flow of the liquid insecticide to the applicator or distributor parts of the device, subject to a rubbing action or on contact of the livestock with the aforesaid parts arranged for effective results respecting large and small animals.

Another object of this invention is the provision of a livestock oiler or insecticide applicator which is designed and adapted to attract animals such as hogs and cattle to the device and while at the device to rub themselves or to come into contact with the oiled or insecticide laden parts of the device to rid themselves of the molesting insects or parasites.

A further object of this invention is the provision of a device of the character mentioned which is simple yet rugged and durable in construction and positive in action.

With the foregoing, other objects and benefits of the invention will appear when the following description is read in conjunction with the accompanying drawing, in which Fig. 1 is a perspective view of a device embodying the features of the present invention, a portion of the base being broken away.

Fig. 2 is a fragmentary sectional view showing certain features.

Fig. 3 is a fragmentary sectional view of one of the insecticide applicator structures.

The device shown in the drawing has a flat base 10 of wood or other material. A post or upright 11 is arranged on the base at one end thereof. In the present instance the post or upright consists of an angle iron whose lower end is split providing two feet 12 which are apertured to accommodate securing elements 13 of any suitable kind for the purpose of securing the post or upright in a vertical position. A crossbar 14 is attached in any suitable manner to the post or upright 11 at or near the upper end. The parts 11 and 14 constitute a T-shaped support.

Suitable containers 15 are provided for the liquid insecticide, oil or chemical noxious to insects or pests, such as fleas, flies, lice, grub worms and other parasites which infest hogs, cattle and other livestock. The containers 15 are preferably made of glass so that the amount of insecticide in the containers may be readily observed and be replenished from time to time as the occasions arise. Each container 15 has a removable apertured cap 16. A strip of absorbent material serving as a wick 17 has one end thereof secured to the cap 16 on the inside so that the wick will be immersed in the liquid insecticide or oil in the container 15 when the cap 16 is in place on the discharge end of the container as shown in Fig. 2. In the present instance there are two containers 15 there being one at each end of the crossbar 14. Each container 15 is attached to the crossbar 14 by means of a holder comprising an expansible and contractible split sleeve 18 and an L shaped threaded bolt 19. The bolt extends through alined holes respectively in opposed lugs 20 on the adjacent longitudinal edges of the sleeve and the crossbar 14, the bolt 19 being in threaded engagement with one of the lugs 20 whose hole is tapped for that purpose. A shoulder 21 on the bolt 19 clampingly bears on the other lug 20 which secures the sleeve 18 to the crossbar 14 preferably so that the container is inclined with its discharge end uppermost as shown.

For distributing or transferring the insecticide or oil, use is made of link chains 22 which respectively function with the containers 15. Each chain 22 intermediate the ends thereof has one of its links secured to the crossbar 14 by a suitable fastener 23. This provides each chain 22 with two leads 24 and 25 respectively, the lead 24 being longer than the lead 25, and one end of each lead thus being secured to the crossbar 14. The remaining end of each of the chain leads 24 is anchored to the base 10 by a suitable fastening element 26 so that the leads 24 converge downwardly at one side of the post or upright 11 to a common point. The remaining end of each of the chain leads 25 is anchored to the post or upright 11 by a screw 27 or the like so as to converge downwardly at the side of the post or upright 11 opposite the side at which the chain leads 24 are arranged. It will be apparent that the chain leads 24 converge downwardly in an inclined plane with respect to the ground, and that the chain leads 25 converge downwardly substantially in a vertical plane. It will be appreciated that each of the leads 24 and 25 itself may be considered to be a single chain. Restraining chains 28 are linked to the leads 25 between them.

A wick 29 extends along or is interlaced or intertwined with the links of each of the chain leads 24 and 25 throughout the length thereof. Each of the containers 15 is arranged to supply insecticide or oil to one of the leads 24 and one of the leads 25 by virtue of its wick 29. The upper end portion of the wick 29 extends through a tube on the crossbar 14 and then through the cap 16 of the related container 15, said upper end portion being held in contact with the feed wick 17 so as to imbibe and become saturated with the liquid insecticide or oil 30 in the container. A wick 29 may be in the nature of a strip or strand of absorbent material of any preferred kind.

A helical spring or strand of helically wound resilient material 31 surrounds a portion of each of the chain leads 24 and its wick 29. One spring 31 is at or near the lower end of its chain lead, and the other spring 31 is at or near the upper end of its chain lead. The opposite ends of each spring 31 are connected with certain of the links respectively of the related chain lead as at 32. Each wick 29 contacts the convolutions of the related spring 31 keeping the convolutions covered on the inside with the insecticide which works its way between the convolutions to the outside of the spring where it will come in contact with the skin or pelt of an animal rubbing against the spring which together with the chain links and the wick function as a durable insecticide applicator.

Each spring 31 as connected with its chain lead 24 has a limited amount of stretch which prevents its wick from being torn. Also each spring 31 is so connected with certain links of its lead 24 that a number of other links provide slack in the lead 24. Consequently the portion of the chain between the ends of the related spring 31 limits the stretch of the spring while the spring yieldably holds the chain lead normally taut or nearly so, but capable of lateral flexure under pressure of an animal rubbing on the links and/or spring. Therefore it will be understood that the chain leads 24 may assume a longitudinally curved formation to approximate the curvature of an animal's body. Large animals may rub against the upper spring 31 and smaller animals such as hogs may rub against the lower spring 31. The surfaces of the chain leads 24 and 25 and their wicks 29 serve adequately for transferring the insecticide on the skin or pelt of an animal contacting or rubbing against such surfaces.

The wicks 29 remain saturated partly by gravity action or flow of the liquid insecticide or oil and mainly by the power of imbibition of the wicks and the capillary attraction caused by the rubbing action of the animals.

In order to attract the live stock to the device there is provided a tray or other open top receptacle 33 which is attached to the post or upright 11 in a conveniently accessible position. Loose or block salt or a food mixture is placed in the tray which will attract the animals and incidentally induce them to rub themselves for the purposes set forth.

It is obvious that the base 10 may be omitted; that the post or upright 11 may be stuck in the ground; and that the chain leads 24 also may be anchored in the ground.

It is to be understood that while the present embodiment of the invention provides four insecticide applicator elements, one or any other preferred number may be provided; and that the invention is not restricted to the details above described, but includes all constructions and modifications coming within the scope of the appended claims.

I claim:

1. A device for applying an insecticide to live stock including a container of insecticide, a link chain supported in a functioning position, a helical spring surrounding a portion of said chain and having its opposite ends connected with certain links respectively of the chain, and a wick interlaced with the links of the chain and touching said spring, said wick having one end thereof extending into said container immersed in the insecticide to imbibe and become saturated with the insecticide so as to distribute it to surfaces of the chain and said spring.

2. A device for applying an insecticide to live stock including a container of insecticide, a link chain supported in an inclined position, a strand of resilient material helically wound around said chain and having its opposite ends connected with the chain, and a wick interlaced with the links of the chain, said wick having one end leading to said helically wound strand and its other end extending into said container and immersed in the insecticide so as to imbibe and become saturated with the insecticide and distribute it to surfaces of the chain and helically wound strand.

3. A device for applying an insecticide to live stock comprising a container of insecticide, link chains, means anchoring said chains disposed in a downwardly converging relation, helical springs surrounding portions of said chains respectively, each of said springs having its opposite ends connected with certain links respectively of the related chain enabling the spring to stretch but limited by that portion of the chain between the ends of the spring and serving to hold the chain yieldably taut normally and laterally flexible under pressure of an animal, and a wick interlaced with each of said chains having its upper end portion extending into said container and another portion in contact with its spring, whereby the insecticide is transferred to the skin or pelt of an animal rubbing against the structure formed by each chain, wick and spring.

4. A device for applying an insecticide to live stock comprising a container of the insecticide, a link chain, means anchoring the ends of said chain so that the chain extends in an inclined position, a helical spring surrounding said chain and having its opposite ends connected with certain links respectively of the chain spaced from each other in the length of the chain a distance greater than the length of the spring when the latter is unstretched so as to yieldably tauten the chain, and a wick interlaced with the links of the chain and having its lower end portion in contact with said spring, the upper end portion of said wick extending into said container so as to become saturated with the insecticide, for the purpose of transferring the insecticide from the chain or wick or spring to the skin or pelt of an animal rubbing against the chain or wick or spring.

5. A device for applying to the skin or pelt of an animal a liquid noxious to parasites comprising a stationary support, a container of the noxious liquid mounted on said support, said container having a removable cap and a feed strip of absorbent material secured at one end to said cap and immersed in the liquid in said container, a chain whose ends are anchored so that the chain slants with respect to said support, and a wick extending along said chain, one end of the wick extending through said cap and having its upper end in contact with said feed strip, the provision and arrangement being such that some of the liquid will be transferred to the skin or pelt of an animal rubbing against or contacting said chain and wick.

References Cited in the file of this patent
UNITED STATES PATENTS

| | | |
|---|---|---|
| 810,336 | Higgins | Jan. 16, 1906 |
| 1,129,977 | Hagny | Mar. 2, 1915 |
| 1,360,007 | Morrison | Nov. 23, 1920 |
| 1,542,891 | Klaassen | June 23, 1925 |
| 1,999,122 | Clark et al. | Apr. 23, 1935 |
| 2,641,225 | Kirk | June 9, 1953 |
| 2,688,950 | McKinley | Sept. 14, 1954 |
| 2,690,162 | Kremer | Sept. 28, 1954 |
| 2,697,415 | Peterson | Dec. 21, 1954 |
| 2,706,465 | Caldwell | Apr. 19, 1955 |